Nov. 15, 1966     J. M. DIEHL ETAL     3,284,938
DISPLAY ADVERTISING DEVICE COMBINED WITH
AUTOMOTIVE VEHICLE BODIES

Filed Aug. 25, 1965     8 Sheets-Sheet 1

INVENTORS.
JOHN M. DIEHL
RUSSELL L. JOHNSON
RUDOLPH J. KAMENICK
BY
*John L. Diehl*
ATTORNEY Nov. 15, 1966     J. M. DIEHL ETAL     3,284,938
DISPLAY ADVERTISING DEVICE COMBINED WITH
AUTOMOTIVE VEHICLE BODIES
Filed Aug. 25, 1965     8 Sheets-Sheet 2
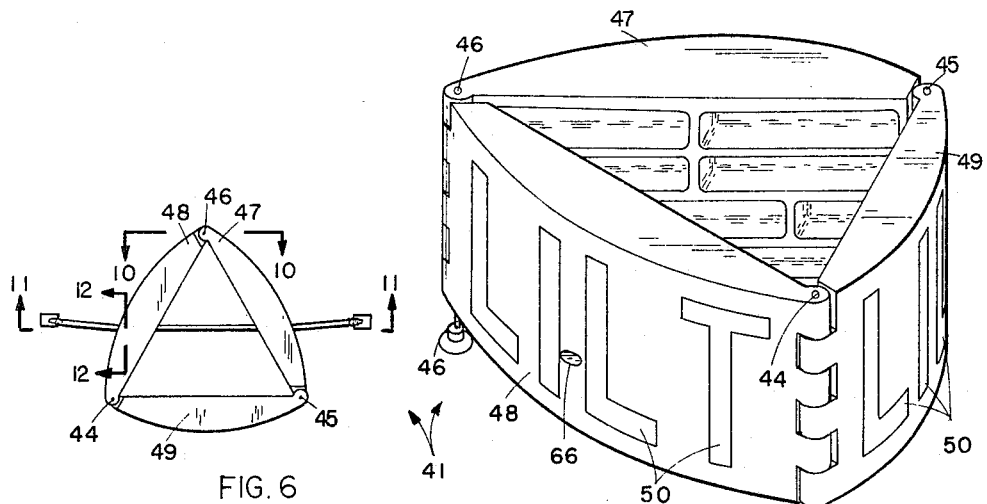
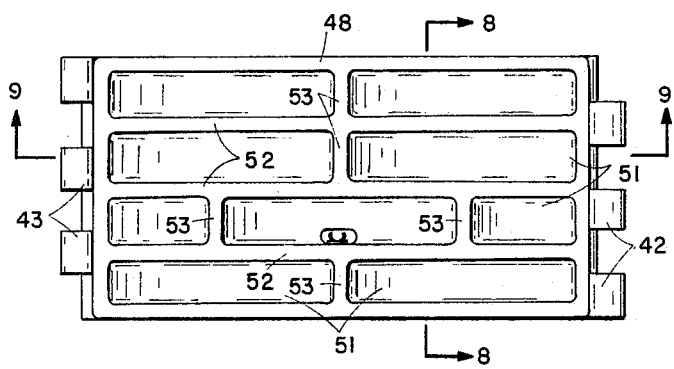
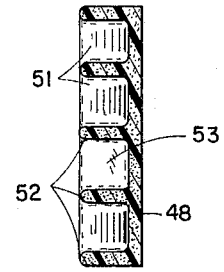
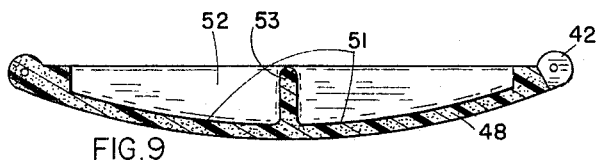
INVENTORS.
JOHN M. DIEHL
RUSSELL L. JOHNSON
RUDOLPH J. KAMENICK
BY John M. Diehl
ATTORNEY Nov. 15, 1966    J. M. DIEHL ETAL    3,284,938
DISPLAY ADVERTISING DEVICE COMBINED WITH
AUTOMOTIVE VEHICLE BODIES
Filed Aug. 25, 1965    8 Sheets-Sheet 3

INVENTORS.
JOHN M. DIEHL
RUSSELL L. JOHNSON
RUDOLPH J. KAMENICK
BY
ATTORNEY

Nov. 15, 1966 J. M. DIEHL ETAL 3,284,938
DISPLAY ADVERTISING DEVICE COMBINED WITH
AUTOMOTIVE VEHICLE BODIES
Filed Aug. 25, 1965 8 Sheets-Sheet 4

INVENTORS.
JOHN M. DIEHL
RUSSELL L. JOHNSON
RUDOLPH J. KAMENICK
BY
ATTORNEY

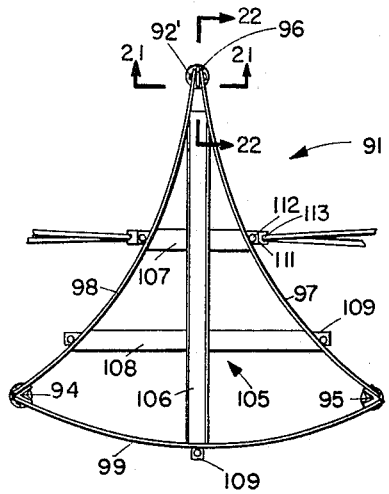
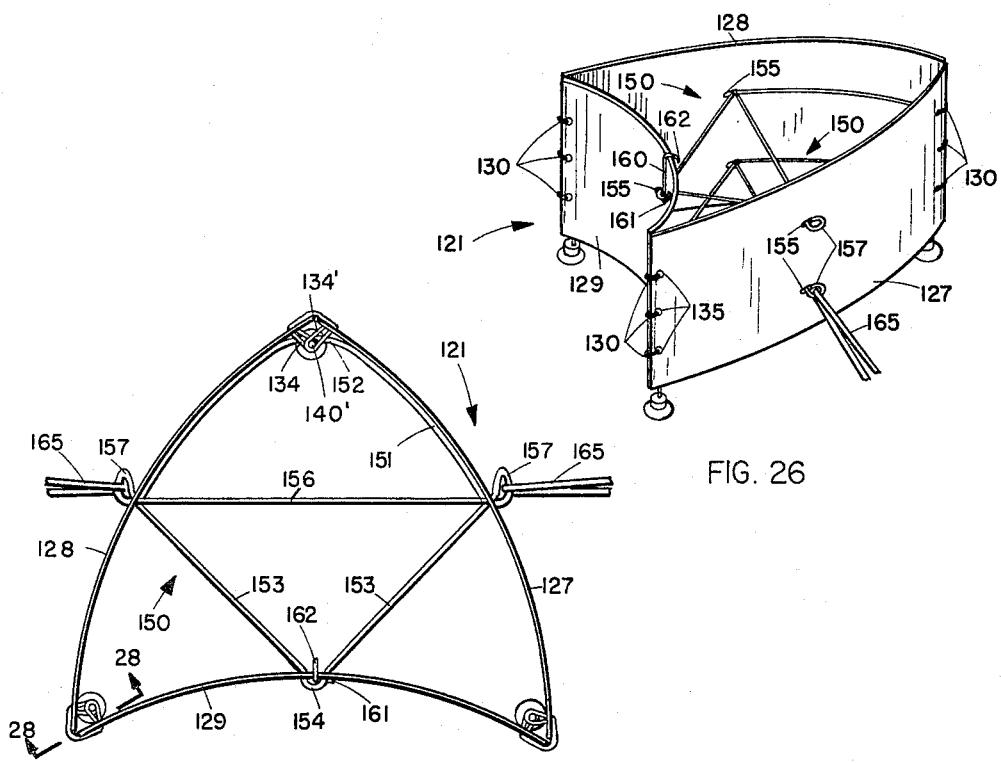
FIG. 20
FIG. 26
FIG. 25

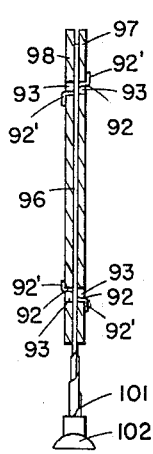
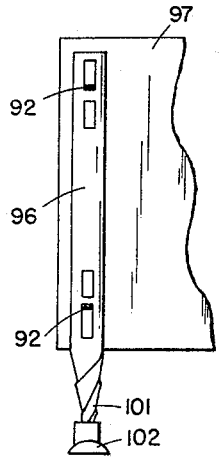
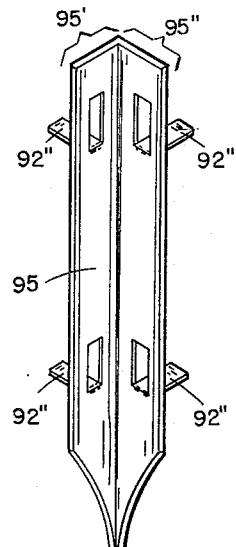
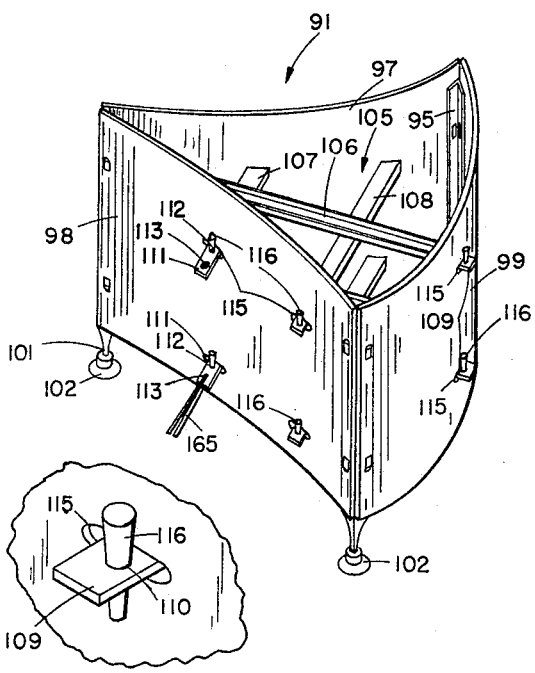

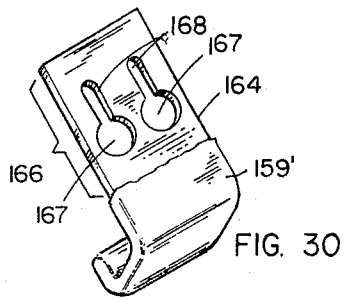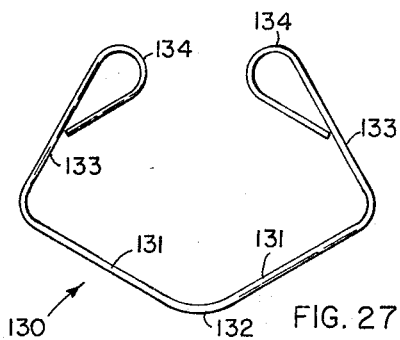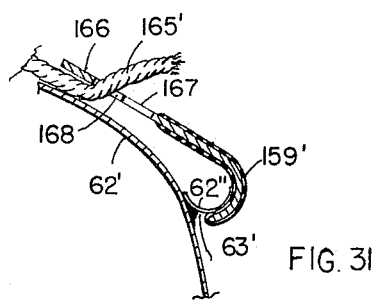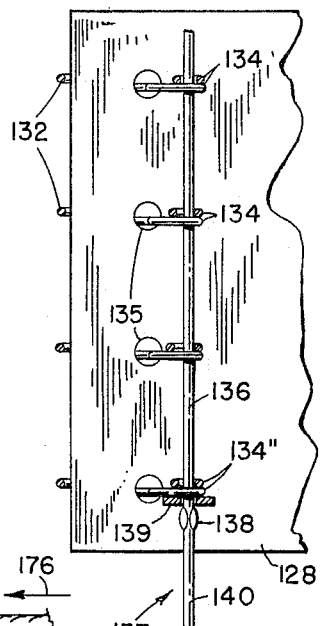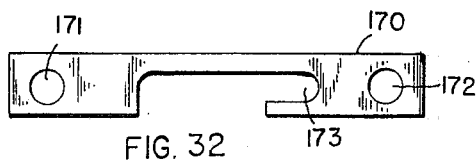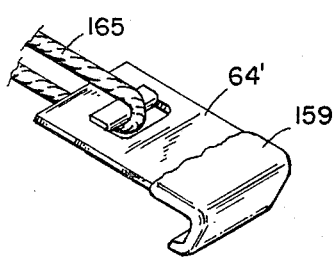

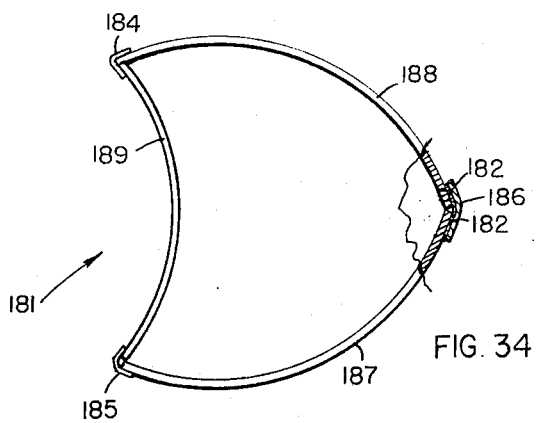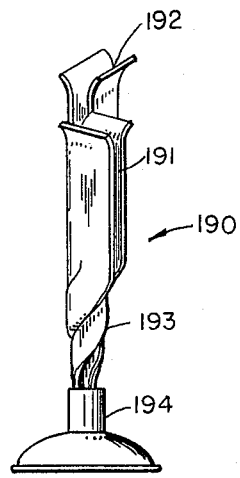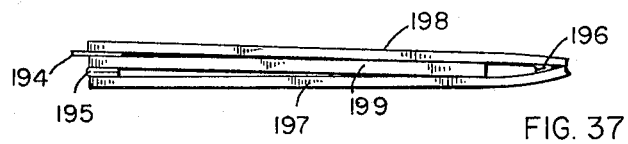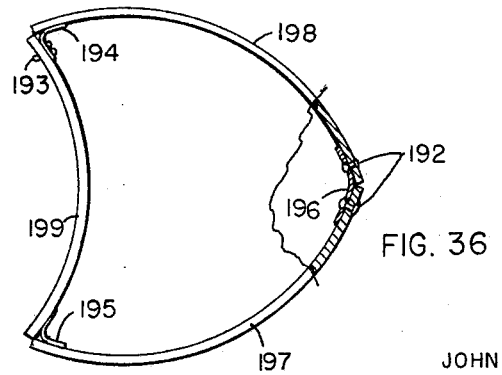

ness patent office
3,284,938
Patented Nov. 15, 1966

3,284,938
DISPLAY ADVERTISING DEVICE COMBINED WITH AUTOMOTIVE VEHICLE BODIES
John M. Diehl, 5729 Elder Place, and Rudolph J. Kamenick, 1710 Kenneth St., both of Madison, Wis., and Russell Lee Johnson, 837 Lynch Ave., Appleton, Wis.
Filed Aug. 25, 1965, Ser. No. 482,551
14 Claims. (Cl. 40—129)

This invention relates to a display advertising device extending upwardly from the top of an automotive vehicle body and more particularly relates to such a device having three corners which is readily removable and replaceable and readily disassemblable and assemblable. Heretofore display advertising devices have been extensively used which have been placed upon the top of automotive vehicles, primarily automobiles and which have comprised three vertically extending panels joined at the vertical edges to provide substantially a three-cornered box having no top or bottom. U.S. Patent 2,077,585 shows such a device wherein both a top and bottom are provided but these have been omitted in many embodiments. Such devices have been made in many different ways with various internal bracing structures to prevent inward collapse of the relatively thin panels which have been used and with various means provided to support them on the top of the automotive vehicle and to provide for attachment of the structure to the automotive vehicle.

Such signs have various distinct advantages. Primary among these are that the triangular structure is inherently relatively strong, that it is in a rudimentary sense relatively streamlined as compared with other devices which have been used on the tops of automotive vehicles and especially that it has maximum visibility to occupants of automotive vehicles approaching the vehicle on which the device is displayed both from the same direction, that is, from the rear and from the opposite direction and also has maximum visibility for pedestrians. High visibility is due to the fact that the rear of the vehicle carrying the device, when it is in motion, is displayed for a relatively long time both to vehicles approaching from the rear and to pedestrians who notice the sign for the first time as the vehicle is abreast of them and then turn to watch it. To utilize this relatively long exposure the rear panel is exposed in a relatively transverse direction to lines of vision of such pedestrians and occupants of such vehicles. On the other hand, the time during which the front of the car is presented directly both to pedestrians and to oncoming vehicles is relatively short and because of the closing speed with such vehicles and even with such pedestrians, the observers usually do not have an opportunity to read such a sign until the vehicle carrying it is nearly abreast, the interval between first observing the sign and beginning to read it having been taken up in catching the attention of the would-be reader. Presentation of each of the forward panels at substantially a 60° angle to occupants of oncoming cars and to pedestrians which are being approached by the vehicle carrying the sign therefor has been observed to result in maximum attention-catching characteristics and maximum readability.

However, all such signs which have been utilized, so far as is known, have exhibited one or more of several difficulties. Most have been relatively expensive. Many have been heavy and cumbersome to install and relatively difficult to dis-install or remove. Some have been made of cardboard; i.e., that is, corrugated boxboard, and have lacked weather resistance. Many of those which have been least expensive and least cumbersome have insufficient structural strength to resist high wind velocities which result from present day high speed driving. A particularly important difficulty when it is desired to distribute a great many such advertising display devices has been that with most such structures which have heretofore been utilized it has not been possible to ship them in pieces; i.e., "knocked down," and put them together at their points of destination without trained labor and special tools. However, it is desirable that this be possible because shipping the devices after they have been assembled is extremely cumbersome and inefficient. Thus, a station wagon which has sufficient space to carry 300 or 400 kits of parts for signs in accordance with invention, can carry only 8 fully assembled within the same space, that is, within the vehicle, even with the tail gate open. Similar results are observed for both large and small trucks. Thus, with the signs of this invention the weight carrying ability rather than the available space in the freight vehicle is the determining factor.

It has been proposed to utilize such advertising display devices which are held in place on top of the automotive vehicle by pads covered on their bottom sides with pressure-sensitive adhesive. Such adhesive has been found in over thirty cases to leaves unremovable marks on the vehicle, the marks being unsightly and so permanent that repainting of the vehicle does not suffice to hide or remove them.

Therefore it is an object of the invention to provide on the top of an automotive vehicle an advertising display device having three vertical corners with one panel presented substantially rearwardly and two front panels presented forwardly at substantially 60° to the axis of the vehicle, which:

Resists high wind velocity

Resists weathering, especially rain for periods of several days,

Is readily assemblable in only a few minutes, for example, about 3 minutes, without tools, Is readily disassemblable in a similarly short time without tools, Can be installed on the top of an automotive vehicle in a short time, for example, less than 60 seconds, Can be removed from the top of an automotive vehicle in a short time, for example, less than 20 seconds, Can be assembled and disassembled and installed on an automotive vehicle and removed from an automotive vehicle by unskilled persons, Will not damage the top of the automotive vehicle, Leaves no marks on the top of the automotive vehicle, Can be installed on an automotive vehicle and removed therefrom by a person of little physical strength and therefor can be easily handled by a woman.

All of these objects are achieved by providing such a device in which each of the three panels which provide the three sides of the device is curved either inwardly or outwardly. In particularly preferred devices the front two panels are curved outwardly and the one rear panel is curved inwardly. In a less preferred device, the two front panels are curved inwardly and the rear panel is curved outwardly. The several possible embodiments are described schematically below and the preferred embodiments are described in detail below.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 5 is a perspective view of a specific embodiment in accordance with the generalized embodiment or sub-genus indicated schematically in FIGURE 3;

FIGURE 6 is a top plan view of the embodiment of FIGURE 5;

FIGURE 7 is an elevation from the inside of one of the panels of the embodiment of FIGURE 5;

FIGURE 8 is a cross-sectional view taken on lines 8—8 in FIGURE 7;

FIGURE 9 is a cross-sectional view taken on lines 9—9 of FIGURE 7;

FIGURE 19 is a perspective view in detail of another embodiment which corresponds to be generalized embodiment or sub-genus shown in FIGURE 4;

FIGURE 20 is a top plan view of the embodiment of FIGURE 19;

FIGURE 21 is a cross-sectional view taken on lines 21—21 in FIGURE 20;

FIGURE 22 is a cross-sectional view taken on lines 22—22 in FIGURE 20;

FIGURE 23 is an enlarged fragmentary perspective view of a portion of FIGURE 19;

FIGURE 24 is an enlarged view of one of the elements of FIGURES 19 and 20;

FIGURE 25 is a top plan view of an embodiment wherein there is shown the specific details of construction of an embodiment according to the generalized embodiment or sub-genus of FIGURE 1;

FIGURE 26 is a perspective view of the embodiment of FIGURE 25;

FIGURE 27 is a plan view of a part used in providing the embodiment of FIGURES 25 and 26;

FIGURE 28 is a cross-sectional elevation taken on lines 28—28 in FIGURE 25;

FIGURE 29 is a perspective view of a hook which may be utilized to attach the device of the invention to an automotive vehicle as shown in FIGURE 11;

FIGURE 30 is a perspective view of a hook to be utilized to attach the device of the invention to an automotive vehicle;

FIGURE 31 is a fragmentary cross-sectional view of the application of the hook of FIGURE 30;

FIGURE 32 is a plan view of a device which may be utilized to tighten a rope;

FIGURE 33 is an elevation of an application of the device of FIGURE 32;

FIGURE 34 is a top plan view of three panels of another embodiment in accordance with the generalized embodiment of FIGURE 1;

FIGURE 35 is a top plan view of the panels of the embodiment of FIGURE 34 folded into form suitable for shipping;

FIGURE 36 is a top plan view of a modification of the embodiment of FIGURE 34;

FIGURE 37 is a top plan view of the panels of FIGURE 36 folded into form for shipping;

FIGURE 38 is a perspective view of a leg member which may be utilized in conjunction with either the embodiment of FIGURE 34 or the embodiment of FIGURE 36 to support such embodiment on the top of an automotive vehicle.

Figure 1:
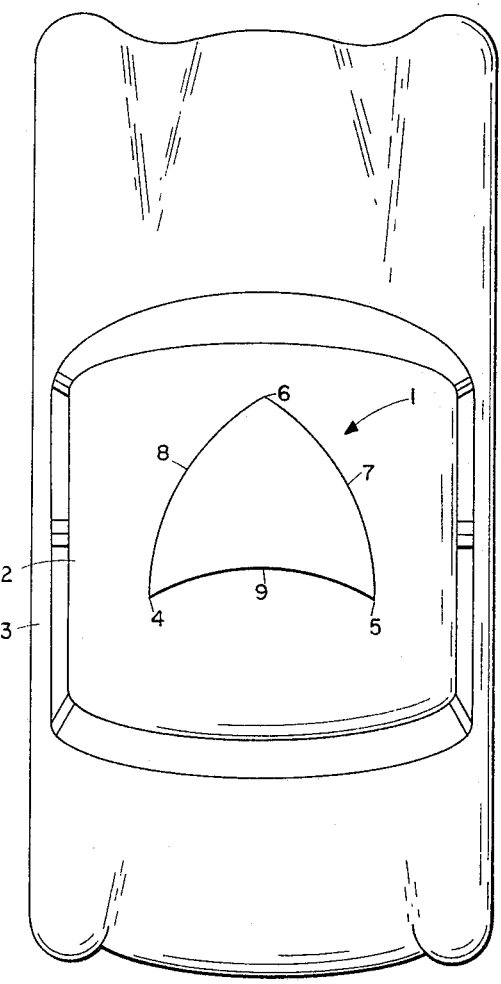
FIGURE 1 is a schematic plan view of one embodiment on top of an automobile.

Referring now to FIGURE 1 the advertising display device indicated generally as 1 is attached by means, not shown, to the top 2 of automobile 3. It has three vertical corners 4, 5 and 6 and three side panels 7, 8 and 9. Panel 9 is curved inwardly and faces generally to the rear. Panels 7 and 8 are curved outwardly and face forwardly and sidewardly respectively rightward and leftward at about 60° to the longitudinal axis of the car.

Figure 2:
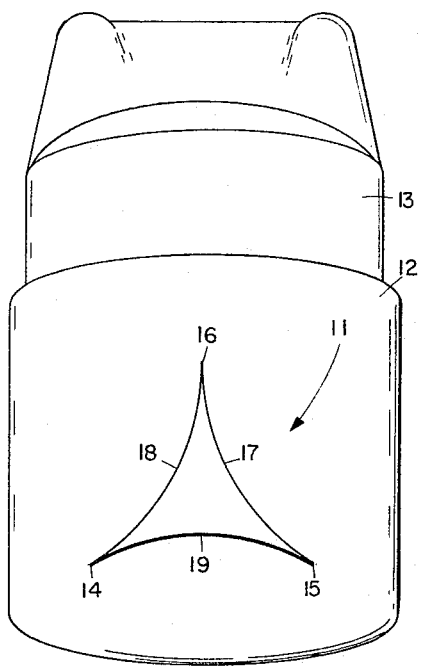
FIGURE 2 is a schematic plan view of a second embodiment on top of a truck.

Referring now to FIGURE 2 there is shown advertising display device 11 extending upwardly from the top 12 of the cab of truck 13. It is held in place by means not shown, and comprises generally three vertically extending corners 14, 15 and 16 at which the vertical edges of panels 17, 18 and 19 are joined. All three of the panels are curved inwardly. Panel 19 generally faces rearwardly, and panels 17 and 18 face in a general manner forwardly and outwardly at about 60° to the longitudinal axis of the vehicle.

Figure 3:
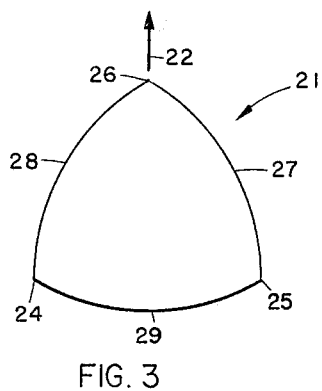
FIGURE 3 is a schematic plan view of another embodiment which may be used on a truck or automobile.

Referring now to FIGURE 3, there is shown advertising display device 21 which may be placed on top of an automotive vehicle as shown in FIGURES 1 and 2 for devices 1 and 11 with the longitudinal axis of the vehicle and the direction of forward travel of the vehicle being indicated by arrow 22. The device comprises generally three vertically extending corners 24, 25 and 26 at which the vertical edges of upwardly extending panels 27, 28 and 29 are joined. All of the panels are curved outwardly and panel 29 faces generally rearwardly while panels 27 and 28 face respectively outward and forward to the right and outward and forward to the left, each facing generally at about 60° to the longitudinal axis of the vehicle.

Figure 4:
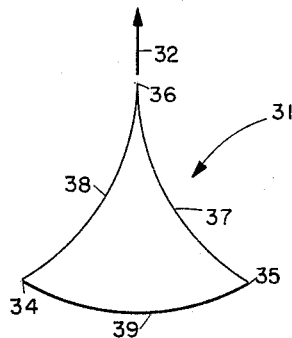
FIGURE 4 is a schematic plan view of still another embodiment which may be attached on top of a body of an automotive vehicle.

Referring now to FIGURE 4, there is shown another embodiment 31 of the advertising display device of the invention which may be installed on top of an automotive vehicle in the manner shown in FIGURES 1 and 2 for devices 1 and 11 with the longitudinal axis of the vehicle and its direction of forward travel being indicated by arrow 32. Device 31 generally comprises three upwardly extending corners 34, 35 and 36 which join the vertically extending edges of upwardly extending panels 37, 38 and 39. Panel 39 is curved outward and faces generally rearwardly. Panels 37 and 38 are curved inwardly and face respectively outward and to the right at about 60° to the longitudinal axis of the vehicle.

Referring now to FIGURES 5 and 6, there is shown a device in accordance with the invention indicated generally as 41 which comprises three outwardly curved panels 47, 48 and 49 joined at joints substantially at vertical edges by leg members 44, 45 and 46. No means are shown in FIGURE 5 for attaching the device to the vehicle but such means are shown in FIGURE 6.

Any panel such as panel 48 as shown in FIGURES 7, 8 and 9 may be taken as typical since in accordance with the invention each of the panels is preferably identical with each other panel. As shown in FIGURES 7, 8 and 9, each such panel preferably is made of foamed synthetic polymeric material such as for example, foamed polystyrene, made in a manner well known in the prior art. Other suitable materials may be polyurethane foam, polyvinylacetate foam, or the like. Each of the panels is preferably provided with projection portions 42 at one end, and projection portions 43 at the other end, each provided with a vertical hole extending therethrough, adapted to provide a hinge-type connection when the projections at one end, that is, one vertical edge, of one panel are interdigitally engaged with the corresponding projections extending from the opposite vertical edge of an adjacent panel. The connection may be completed and the projections securely attached together by inserting thereinto a vertical rod such as the upper portion of leg 46 as shown in FIGURE 10.

Any suitable advertising indicia may be provided on the exterior surface of the panel as indicated at 50.

Inwardly extending cavities 51 may be provided in each of panel sections 48, such as are referred to in the aircraft industry as "lightening holes," to reduce the amount of material required for each panel and to reduce the weight of each panel without adversely greatly affecting the required strength of the panel. Such cavities 51 may be defined by horizontal ribs 52 and vertical ribs 53. Said panels have great strength due to the curved aspect of the front surface of the panel which curvature is maintained by horizontal ribs 52. The vertical ribs 53 serve to prevent buckling by column action of ribs 52 when the panel is loaded in compression by forces acting oppositely against its ends.

Figure 10:
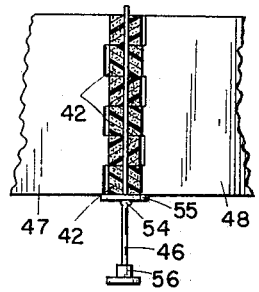
FIGURE 10 is a cross-sectional fragmentary view taken on lines 10—10 in FIGURE 6.
Figure 12:
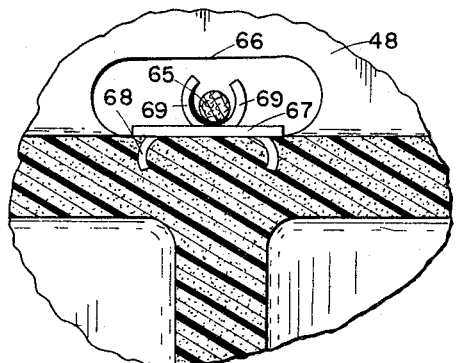
FIGURE 12 is a fragmentary enlarged cross-sectional view taken on lines 12—12 in FIGURE 6.
Figure 11:
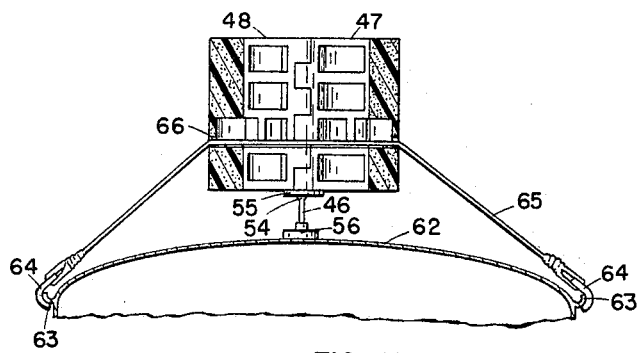
FIGURE 11 is a cross-sectional view taken on lines 11—11 in FIGURE 6.
Figure 13:
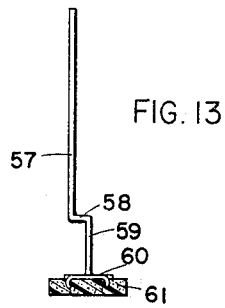
FIGURE 13 is a partially cross-sectional elevation of a leg which may be utilized as shown in FIGURES 6, 10 and 11 in assembling the panels of FIGURE 5 and which may be also utilized in FIGURES 14 and 15.

Referring now to FIGURES 5, 10 and 11, legs such as legs 44 and 46 may be provided to support the device on top of an automotive vehicle. Preferably each of the legs comprises an upwardly extending vertical portion as shown best at FIGURE 10, which serves to interconnect two adjoining panels. Each of the legs may be provided with a knob or staked portion at 54 to support a washer 55 thereon, upon which the ends of the panels may rest, and may be provided with a rubber pad or foot to prevent marring of the top of the vehicle by the bottom ends of the legs. Other suitable arrangements may be used. For example, a suitable leg as shown in FIGURE 13 may comprise a vertically extending upward portion 57, laterally extending portion 58 to serve to support the ends of two adjacent panels in place of washer 55 and downwardly extending portion 59 terminating in a sheet metal portion 60 which may engage a pad 61 of foamed synthetic resin such as foamed polyethylene, foamed polystyrene, foamed polyvinylacetate or foamed polyurethane to prevent marring the top of a vehicle. Means to attach the device to the top of an automotive vehicle may suitably be provided as shown in FIGURES 6, 11 and 12. As shown in FIGURE 11 the top 62 of an automotive vehicle is provided with rain gutters 63. Hooks 64 are provided which hook respectively over each of the rain gutters and rope 65 is provided which is tied to one of the hooks and thence extends through the device and is then suitably tied to the other hook to maintain the device in place. Rope 65 may be received in suitable apertures in the panels of the device such as aperture 66 in panel 48. Aperture 66 is preferably provided adjacent the upper surface of one of ribs 52 so that there may be provided a suitable fitting 67 of sheet metal supported by the upper surface of said rib and engaged therewith with stamped out downwardly extending hooklike portions 68. Rope 65 may be held in place by upwardly stamped out portions 69. Fitting 67 serves to prevent the rope from acting abrasively against edges of apertures 66 with resultant enlargement of the aperture in a manner both unsightly and tending to produce enlargement of aperture 66. Enlargement of the aperture on its bottom surface tends to result in loosening of the rope with decreasing security of the fastening to the vehicle.

As shown in FIGURES 14–17, an embodiment may be provided as shown schematically in FIGURE 2 which may comprise three panels 77, 78 and 79. Each of the panels may be of plywood, hardboard, fiberboard, or synthetic resinous sheet. Panels consisting essentially of cellulosic wood fiber compressed at a temperature and pressure sufficient to cause the fiber to be firmly bonded together by lignin or other materials present in the wood fibers themselves, when the materials are caused to react by the heat, have been found to be particularly suitable. Such panels bearings the registered trademark "Masonite" are sold by the Masonite Corporation, but panels of corresponding material are sold by several other companies and are found to be altogether suitable. Comparable products wherein fibers or chips of wood are bonded together solely by synthetic resin or partly by synthetic resin and partly by materials present in the wood may also be suitable. Leg members 74, 75 and 76 are provided at each of the corners, where vertical edges of adjacent panels adjoin, to support the device. Leg members, as shown, may have the form shown in FIGURE 13 or alternatively if desired, may have the form shown in FIGURE 10 or may have the form shown in FIGURE 28. Each panel is provided near each vertical edge with a plurality of aligned holes 72 and panels are held together at the corners of the device, where the vertical edges of the panels adjoin, by clips 73 which extend through the holes. Each clip is provided with a loop to receive the upper vertical portion of the leg such as portion 57 as shown in FIGURE 13.

Figure 18:
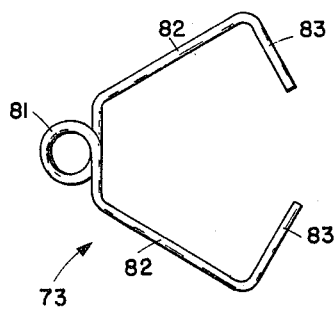
FIGURE 18 is a plan view of a clip used to fasten together panels in the embodiment of FIGURES 14 and 15.
Figure 17:
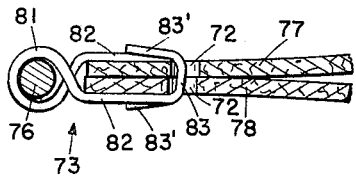
FIGURE 17 is a cross-sectional plan view of one corner of the embodiment of FIGURE 14.

In FIGURE 18, a clip is shown in the open position before it is utilized to attach two panels together at a corner and in FIGURE 17 a clip corresponding to that of FIGURE 18 is shown after being installed to hold the edges of two panels together. Each of clips 73 comprises a loop portion 81 which consists essentially of a single helix. The helix terminates in two laterally extending portions 83 which prior to installation extend at a considerable angle to each other as shown at FIGURE 18 and after installation extend almost parallel to each other as shown in FIGURE 17. Each of portions 82 is bent (at the end most remote from loop 81) to provide end portions 83 each of which extends inwardly and laterally with respect to its corresponding portion 82 prior to installation. Each of clips 13 is installed by passing each of its portions 83 in opposite directions through two corresponding aligned holes near adjoining vertical edges of two panels respectively, as shown in FIGURE 17, and then bending the outer portions 83' of portions 83 to extend almost parallel to the surfaces of the respective panels as shown in FIGURE 17. After all of the clips are installed at a corner, a leg such as leg 76 may be passed through the thus vertically aligned loops 81 of the clips or if desired loops 81 of a plurality of clips may be passed over upper vertically extending portion of a leg prior to juxtaposing the clips with adjoining edges of two panels and installing them to provide attachments as shown in FIGURE 17.

Figure 16:
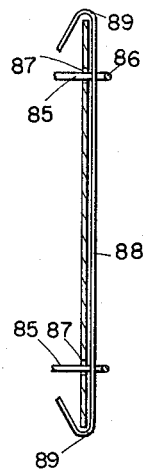
FIGURE 16 is an enlarged cross-sectional cut-away view taken on lines 16—16 of FIGURE 14.
Figure 14:
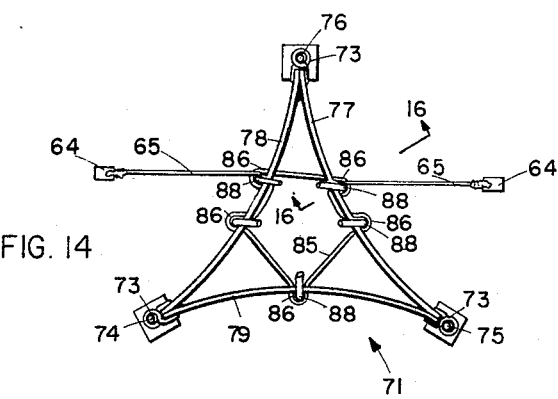
FIGURE 14 is a top plan view showing in detail another embodiment which may be provided in accordance with the generalized species or sub-genus of FIGURE 2.
Figure 15:
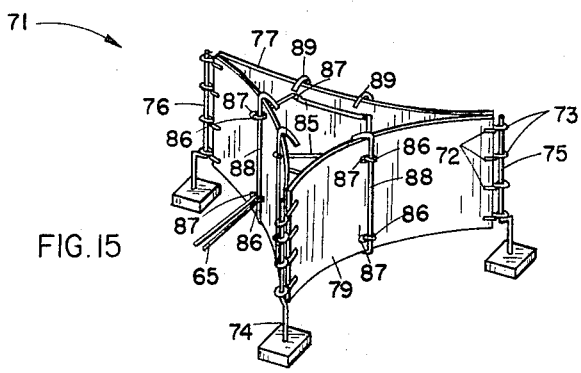
FIGURE 15 is a perspective view of the embodiment of FIGURE 14.

It is necessary to the invention to provide a curvature in each of the panels and necessary to the embodiment of FIGURES 14 and 15 to provide an inwardly extending or concave curvature in each of the panels. This curvature may be provided by installing one or more wire braces 85 as shown in FIGURES 14, 15 and 16.

To provide for attachment of braces to the panels, outwardly extending loops 86 may be provided in braces 85 and apertures 87 may be provided in the panels to receive loops 86. Vertically extending wires 88 may extend through the loops and the wires may be bent over the top and bottom edges of the panel as shown at 89 to retain them in place. Means may be provided to attach the embodiment of FIGURES 14 and 15 to the top of an automotive vehicle which, as shown, may be identical with that shown in FIGURES 6 and 11.

As shown in FIGURES 19–23, a device indicated generally as 91 may be provided in accordance with the sub-genus shown in FIGURE 4. Device 91 may comprise panels 97, 98 and 99 which are preferably made of a material such as discussed in connection with FIGURES 14 and 15. At each of the corners of the device where vertical edges of the panels adjoin, a leg member may be provided to support the device on the top of an automotive vehicle and to attach the adjoining edges of adjacent panels together, such as legs 94, 95 and 96.

A suitable leg for use with the device may be of sheet metal as indicated in connection with leg 96 and may have tabular portions stamped out therefrom as indicated at 92 which may extend outwardly through aligned holes 93 in adjoining panels; the outer portions of tabs 92 may be bent against the outer surfaces of the panels to hold the panels against the legs as shown at 92'. Sheet metal at the bottom of leg such as leg 96 may be rolled somewhat or otherwise compressed to provide a somewhat cylindrical portion as indicated at 101 which may receive a vacuum cup 102 as shown or may be provided with any other suitable type of pad such as pad 56 shown in FIGURE 10 or 61 shown in FIGURE 13 to prevent marring of the top of an automotive vehicle.

A rear leg may be a sheet metal member bent to provide two flat metal portions each respectively parallel to and lying against an interior surface of an adjoining panel. As shown in FIGURE 24, leg 95 may comprise such portions indicated as 95' and 95" and tabs 92" may be stamped out therefrom which upon being received in apertures 93 in the panel may then be bent upwardly or downwardly as indicated in FIGURE 21 to retain the panels against the leg member.

In accordance with the invention, the rear panel 99 of device 91 is curved outwardly and the forward panels 97 and 98 are curved inwardly. This curvature is provided and maintained by brace members 105, each of which may comprise a longitudinal member 106 having two lateral members 107 and 108 rigidly affixed thereto. Braces 105 may be made of wood or the like or may, as shown, be made of sheet metal stamped into channel beam shape; that is, each of members 106, 107 and 108 has the cross-sectional shape of a channel beam. The ends of members 108 and the rear ends of members 106 are provided with projecting portions 109 each of which may have aperture 110 therein. The ends of members 107 are provided with portions 111 which project somewhat further than projections 109. Each projection 111 is provided with two apertures respectively, 112 and 113, therein. Projections 109 and 111 extend through apertures 115 provided in the panels so that said apertures 110 and 112 respectively are disposed outside the outer faces of the panels. Cotter pins or pins 116 as shown may be inserted in apertures 110 to lock the braces in place with respect to the panels and to maintain the curvature of the panels with respect to brace members so that the desired curvature is obtained and maintained in the panels during use. The device may be held on top of an automotive vehicle by ropes 165 which may extend to a gutter hook on each side as shown below in connection with the embodiment of FIGURES 25 and 26.

Referring now to FIGURES 25 and 26, a preferred embodiment indicated generally as 121 is shown in detail in accordance with the sub-genus of FIGURE 1. Device 121 may comprise forward panels 127 and 128 and rear panel 129. The panels may be made of a material such as discussed in connection with the panels of FIGURES 14 and 15. At the three corners of the device, the adjoining vertical edges of two adjacent panels may be attached together by the use of metal wire articles 130 as shown in FIGURE 27, referred to hereinafter as clips 130. Each of clips 130 comprises two laterally extending straight portions 131 which are joined at bend 132. At the outer ends of each of portions 131, that is, the ends most remote from bend 132, the wire of the clip is bent inward to provide straight laterally extending portions 133 which may extend as shown at substantially about right angles to portions 131. At the ends of portions 133 the wire may be bent inward to provide loops 134 which may be closed as shown or may only be partially closed as shown for example at 134' in FIGURE 25. Each of the panels is provided with a plurality of vertically aligned holes or apertures 135 near each vertical edge thereof to fasten the joining vertical edges of two adjacent panels together. To assemble the device, the panels are placed together in position generally approximating that desired in the completed device. At each pair of holes or apertures 135 which are opposite each other, the loops 134 and then portions 133 of a clip are inserted through opposite holes of the pair while bending the clip at bend 132 to decrease the included angle between portions 131 so that loops 134 will overlap as shown at 134 in FIGURES 25 and 28. The upper vertically extending portions 136 of legs 137 as shown in FIGURE 28 may then be inserted through the thus vertically aligned plurality of loops to lock together the loops of each clip. To provide means for supporting the device on the top of an automotive vehicle each of legs 137 may be provided with a projection 138 which may correspond to projection 54 on leg 46 as shown in FIGURE 10. Projection 138 may serve to retain the place washer 139 thereon which may act against loops 134" of the lowermost clip to support the device above the top of the automotive vehicle. Projection 138 may be made in any desired manner or may be replaced by a bent portion such as laterally extending portion 58 in the leg of FIGURE 13. Below projection 138 the leg may have a downwardly extending portion 140 which may serve to space the device from the top of an automotive vehicle. The bottom of portion 140 may be provided with a vacuum cup 142 which may correspond to member 102 in FIGURES 19, 21 and 22 or alternatively may be provided in place of 142 with a member such as 56 in FIGURE 10 or 61 in FIGURE 13 to prevent marring, scratching or other damage to the top of an automotive vehicle on which the device is supported.

To provide and maintain the desired outward curvature of forward panels 127 and 128 and the desired inward curvature of rear panel 129, there may be provided one or more metal wire braces indicated generally as 150. As shown, two such braces are preferred but one may be provided if desired. Each of braces 150 comprises a forwardly extending outwardly curved portion 151, the outward curve being somewhat sharper at the foremost portion 152 of the device than along the sides. Extending inwardly and rearwardly from the rear ends of portion 151 there are provided straight portions 153 which join at rearwardly extending 180° loop or half loop portion 154 which may extend rearwardly through one of apertures 155 in the rear panel. Laterally extending preferably straight portion 156 extends across the device joining the rear ends of portion 151, being rigidly attached thereto. Loops 157 are provided as part of each of braces 150 and extend outwardly from the ends of member 156 through apertures 155 in the forward panels 127 and 128 and thence forwardly as shown. Each of braces 158 is held in place with respect to the forward panels by inserting leg 140' through the interior of portions 151 at the foremost relatively sharper bend 152 provided therein, as well as through loops 134, to hold the brace firmly forward in the device. As each of braces 150 is thus held firmly forward, loops 157 act as hooks with respect to the forward panels to hold the forward panels against and in alignment with portion 151. Rear panel 129 is held in place with respect to the braces and particularly with respect to loops 154 by metal wire members 160, each of which is provided with a hook 161 which extends through one of loops 164 and is bent over an adjacent edge of the rear panel as shown at 162. To attach the device of FIGURES 25 and 26 to the top of an automotive vehicle, a rope may extend from each of loops 157 to a hook such as 64' as shown in FIGURE 29 each of which may be engaged with a rain gutter 63 as shown in FIGURE 11. Each of hooks 64' may be provided, in a manner well known in the art, with a coating 159 of plastic or rubber to prevent scratching of the vehicle by the hook.

Rope 165 may be tied in any suitable manner to provide suitable tension.

However, in a preferred embodiment as shown in FIGURE 30, a hook 164 is provided. Hook 164 has a flat portion 166 to extend inwardly over the top of a vehicle as shown in FIGURE 31, and the hook portion thereof is preferably provided with a coating of rubber or plastic 159' corresponding to the coating 159 on hook 64' in FIGURE 29 to prevent marring and scratching of the vehicle. As shown in FIGURE 31, the hook portion of the hook is engaged with ram gutter 63' attached at 62'' to top 62' of an automotive vehicle. In flat portion 166 there are provided two holes or apertures 167 having slots 168 extending therefrom. Each of the apertures thus provided by holes 167 and slot 168 extending therefrom may suitably have substantially the shape of "keyhole" as shown but aperture 167 need not necessarily be round as shown. In use, a single piece of rope 165' may be passed through one of loops 157 and its two ends then passed respectively through openings 167. Then, the rope near one of its ends is jammed into one of slots 168, as shown in FIGURE 29. It is necessary to the proper functioning of the device that slot 168 be of a suitable width with respect to the diameter of rope to insure a secure attachment. Once a slot width has been determined to be empirically suited for use with a particular size, type and grade of rope, only such rope should be used with such slot. The proper width of slot varies with the type of material used in the rope, the type of structure used for the rope and other variables of rope structure and construction. If thus properly selected, one end of the rope is thus held firmly in one of slots 168. The effectiveness of the device is such that with rope similar to common clothesline, the connection will withstand a tension of over 250 pounds and and impact greater than that provided by a 250 pound weight falling one foot. Once one end of the rope is firmly attached to the hook in the manner thus described, the other end may be pulled through the other one of apertures 167 with great force. Because the rope slides through loop 157 as if it were a pulley, this arrangement provides in effect a two-part tackle so that great force may be easily applied. When sufficient force is appled, the other end of the rope may be secured by simply forcing it back into the other one of slots 168.

A conventional and satisfactory method for tensioning a rope to hold the device of the invention in place which, however, is suitable is shown in FIGURES 30 and 31, wherein there is provided member 170 which may be of sheet metal, sheet plastic or the like, and may be provided with an aperture or hole 171 at one end and another aperture or hole 172 at the other end. A cut-away portion in the center extends inwardly from one edge and thence longitudinally toward one end to provide recess 173. In use, the end of the line is attached to device 170 by passing it through aperture 172 and tying it at 174. From 174, the rope may extend as shown at arrow 175, through a loop 157 or through the eye of a hook 64' as shown in FIGURE 29 and then may extend back as shown at arrow 176, through recess 173 and thence through aperture 171 to be tied respectively to a hook such as hook 64 or hook 64' or to be tied to a loop such as 157 or an aperture in a projection such as 113 (FIGURE 19). Due to the friction of the rope with the edges of aperture 171 as it bends sharply to go through the aperture, the device tends to resist slipping along the rope. To adjust the device and increase the tension in the rope, the rope is lifted out of recess 173 and device 170 is placed at an angle to the rope so that the rope slips more easily through aperture 171 whereupon the rope can be tightened by hand and then device 170 replaced in the attitude shown in FIGURE 31.

Referring now to FIGURE 34, there is shown an embodiment of the device of this invention indicated generally as 181 and comprising forward panels 187, 188 and rear panel 189 which is held together respectively at its corners by strips of tape 184, 185 and 186, each of these strips being attached to adjoining vertical edge portions of the panels by adhesive 182.

For simplicity, the means whereby the desired curvature of the panels is provided and maintained is not shown, nor is the manner in which the device is supported above the top of an automotive vehicle nor is the manner nor the means whereby the device is attached to the top of an automotive vehicle. All of such means may be as shown in conjunction with FIGURES 25 and 26, or as shown in conjunction with FIGURES 14 and 15 or in any other suitable manner such as by modification of the means shown in FIGURES 19 and 20. The device may be supported on an automotive vehicle by engaging a leg member indicated generally as 190 as shown in FIGURE 38 with each corner thereof. Each of leg members 190 may be made of sheet metal or other suitable material which may suitably be made to provide two slots 191 and 192 into which the adjoining portions of two panels at a corner of the device may be inserted. The bottom of the leg may be suitably bent or twisted at 193 to provide a rigidified portion which may receive any suitable pad or vacuum cup 194 thereon to prevent marring of an automotive vehicle.

As shown in FIGURE 35, a particular advantage of the embodiment of FIGURE 34 is that prior to being disposed in the form shown in FIGURE 34, the panels may be joined and folded in the manner shown in FIGURE 35 with a backing strip 183 attached to the outwardly extending portion of 184 to prevent adherence of said outwardly extending portion 184 in an undesired manner prior to construction of the sign. Rear panel 189 is preferably somewhat shorter than panels 187 and 188 so that panels 188 and 187 may be joined at their forward edges by tape 186 with the edges being in contact. Panels 187 and 189 are joined by tape 185 as shown and panels 187 and 188 are joined by tape 186 as shown. In order to set up the sign into the position shown in FIGURE 34, backing strip 183 is removed from the outwardly extending portion of strip 184 and the thus exposed adhesive 182 on strip 184 which may be pressure-sensitive adhesive is caused to adhere to the outer surface of panel 189 near its left rear vertical edge.

In FIGURE 36 there is shown an embodiment which corresponds to that of FIGURE 34 but wherein the panels 197, 198 and 199 are attached together at the corners of the device by metal strips 194, 195 and 196 which are attached to the panels by rivets 192, except at the left vertical edge of panel 199 where strip 194 is attached to panel 199 with cotter pins or other like devices. Thus, as shown at FIGURE 37, the device may be folded, panel 199 being preferably slightly shorter than panels 197 and 198. Strips 194, 195 and 196 are preferably made of a ductile metal which may bend easily and repeatedly for as many times as necessary. Thus, the device may have the configuration shown in FIGURE 37 when shipped. By bending the metal strips the device may be formed into the position shown in FIGURE 36 whereupon strip 194 may be suitably bent and cotter pins 193 installed to attach the left rear vertical edge of panel 198. Means for maintaining a desired curvature of panels 197, 198 and 199, for supporting the device on the top of an automotive vehicle and for attaching the device to the top of an automotive vehicle may be provided as discussed in conjunction with FIGURE 34.

The structural details shown and discussed in connection with FIGURES 5 to 13 may be utilized to provide any one of the sub-genuses of FIGURES 1–4 but are found preferable for use in the manner shown.

The general mode of attaching the panels of the device together, maintaining the desired curvature of the panels and supporting them on top of the automotive vehicle as shown in FIGURES 14–18 may be utilized to provide a device in accordance with any one of the sub-genuses of FIGURES 1–4.

Likewise, the means shown for attaching the panels together, providing and maintaining the desired curvature thereof, and supporting the device on the top of an automotive vehicle shown and discussed in connection with FIGURES 19-24 may be utiized with any one of the sub-genuses of FIGURES 1-4 but is preferably best utilized with the genus of FIGURE 4 as shown.

The specific details of the structure provided in accordance with FIGURES 25, 26, 27 and 28 for providing a preferred embodiment in accordance with the sub-genus of FIGURE 1 may be varied appreciably as may be apparent to those skilled in the art. However, the specific structure of these figures has been found preferable for providing said sub-genus and the the sub-genus has been found preferable for several reasons. An outstanding reason is that the rearwardly acting force on each of the forward panels which is provided by wind acting against the front faces thereof when the vehicle on which the device is supported is driven at high speeds is substantially balanced by the eddy currents generated by the panels when the panels have the curvature shown. Likewise the force of the wind under such circumstances which acts directly backwards on the rear panel when curved in the manner shown is substantially balanced by the eddy currents generated by the rear panel. Thus, the wire of which braces 150 are made may be relatively light although the total force imposed on the device due to its overall drag at high speeds may be relatively quite great. The force is almost invariably great enough to cause the device to slide backward on the top of the vehicle to some extent so that the ropes which are attached to the top of the vehicle extend forward somewhat as shown in FIGURE 6.

It may thus be seen that the invention is broad in scope and includes such modifications as will be apparent to those skilled in the art and is to be limited only by the claims.

Having thus described our invention, we claim:

1. An advertising display device for attachment to the top of an automotive vehicle comprising:
   three substantially rectangular panels, each panel having two vertical edges,
   vertical edges of each of two adjacent panels adjoining at each corner of the device,
   two of said panels disposed to face outwardly and forwardly at about an average general angle of 60° to the longitudinal axis of the vehicle,
   the third of said panels disposed at the rear of the device to extend transversely with respect to the vehicle,
   each of said panels being curved throughout its length to intersect a horizontal plane in a curved line.

2. The device of claim 1 wherein each of said panels is curved outwardly or convexedly.

3. The device of claim 1 wherein each of said panels is curved inwardly or concavedly.

4. The device of claim 1 wherein said two panels which face forwardly and outwardly are curved inwardly or concavedly and said third rear panel is curved outwardly or convexedly.

5. The device of claim 1 wherein said two panels which face forwardly and outwardly are curved outwardly or convexedly and said third rear panel is curved inwardly or concavedly.

6. The device of claim 5 wherein the curvature of said panels is provided and maintained by two brace members of metal wire.

7. The device of claim 6 wherein each of said brace members comprises
   a forwardly extending outwardly curved portion in contact with inner surfaces of said two forward panels, the foremost portion of which is more sharply curved than the remainder thereof and which is retained adjacent the forward corner of the device,
   a portion extending inwardly and rearwardly from each of the rear ends of said forwardly extending portion,
   said inwardly and rearwardly extending portions being joined at a loop portion,
   a member extending laterally from one rear end of said forwardly extending portion to the other rear end thereof, and
   a loop member extending laterally outwardly and thence forwardly from each rear end of said forwardly extending member.

8. The device of claim 7 wherein each of the panels is provided with an aperture which receives a loop member of each brace member, and wherein each loop member is engaged at each of said apertures with the panel which contains said aperture.

9. The device of claim 8 wherein a rope is attached on each side of the device to one of said loops which extends from each of the rear ends of the forwardly extending portion of said brace member and thence through an aperture in a forward panel and wherein said rope extends from said loop to a hook adapted to engage a rain gutter of an automotive vehicle.

10. The device of claim 9 wherein said hook is provided with a flat portion in which there is provided an aperture having a slot extending toward the direction in which the rope extends from the hook, said slot being smaller in width than the diameter of said rope to engage the rope when it is squeezed into the slot.

11. The device of claim 5 wherein each panel is provided with a plurality of vertically aligned holes extending therethrough adjacent each vertical edge thereof and wherein adjoining vertical edges of adjacent panels at each corner of the device are attached together by a bent metal clip extending through each matching pair of said holes in adjacent panels.

12. The device of claim 9 wherein the ends of said clips which extend through said holes are provided with loops which are vertically aligned and which receive a vertically upwardly extending portion of a leg member to maintain closure of said clips.

13. The device of claim 7 wherein each panel is provided with a plurality of vertically aligned holes extending therethrough adjacent each vertical edge thereof and wherein adjoining vertical edges of adjacent panels at each corner of the device are attached together by a bent metal clip extending through each matching pair of said holes in adjacent panels.

14. The device of claim 13 wherein the ends of said clips which extend through said holes are provided with loops which are vertically aligned and which receive a vertically upwardly extending portion of a leg member to maintain closure of said clips.

References Cited by the Examiner

UNITED STATES PATENTS

| 1,885,282 | 11/1932 | O'Connor | 40—129 |
| 1,890,483 | 12/1932 | Wood et al. | 40—145 |
| 1,942,444 | 1/1934 | O'Connor | 40—129 |
| 2,077,585 | 4/1937 | Rivers | 40—129 |
| 2,790,258 | 4/1957 | Freshour | 40—125 |
| 2,836,914 | 6/1958 | Nelson et al. | 40—129 |
| 2,960,786 | 11/1960 | Wagner | 40—129 |
| 3,153,294 | 10/1964 | Hay et al. | 40—129 |
| 3,167,874 | 2/1965 | Pogue | 40—145 |
| 3,182,414 | 5/1965 | Snediker | 40—125 |
| 3,208,173 | 9/1965 | Shank | 40—129 |

EUGENE R. CAPOZIO, *Primary Examiner.*

S. M. BENDER, *Assistant Examiner.*